United States Patent
Goodno et al.

(10) Patent No.: US 9,106,051 B1
(45) Date of Patent: Aug. 11, 2015

(54) MULTI-WAVELENGTH SEED SOURCE FOR COHERENT FIBER AMPLIFIERS

(71) Applicant: NORTHROP GRUMMAN SYSTEMS CORPORATION, Falls Church, VA (US)

(72) Inventors: Gregory D. Goodno, Los Angeles, CA (US); Joshua E. Rothenberg, Los Angeles, CA (US); Peter A. Thielen, Long Beach, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 0 days.

(21) Appl. No.: 14/322,632

(22) Filed: Jul. 2, 2014

(51) Int. Cl.
  *H01S 3/067* (2006.01)
  *H01S 3/117* (2006.01)
  *H01S 3/13* (2006.01)
  *H01S 3/00* (2006.01)
  *H01S 3/23* (2006.01)

(52) U.S. Cl.
  CPC ........... *H01S 3/06754* (2013.01); *H01S 3/0085* (2013.01); *H01S 3/117* (2013.01); *H01S 3/1301* (2013.01); *H01S 3/1306* (2013.01); *H01S 3/23* (2013.01); *H01S 3/2391* (2013.01)

(58) Field of Classification Search
  CPC ..... H01S 3/0085; H01S 3/06754; H01S 3/23; H01S 3/2391
  See application file for complete search history.

(56) References Cited

U.S. PATENT DOCUMENTS

| | | | |
|---|---|---|---|
| 4,467,468 A * | 8/1984 | Miller | 398/75 |
| 6,400,871 B1 | 6/2002 | Minden | |
| 6,559,986 B1 | 5/2003 | Sauer | |
| 6,850,712 B1 | 2/2005 | Delavaux | |
| 7,280,568 B2 | 10/2007 | Williamson, III | |
| 7,796,654 B2 | 9/2010 | Murison | |
| 8,374,206 B2 | 2/2013 | Peng | |
| 8,531,761 B2 | 9/2013 | Chann | |
| 2005/0286894 A1* | 12/2005 | Duelk | 398/75 |
| 2007/0014319 A1* | 1/2007 | Hill et al. | 372/20 |
| 2008/0085115 A1* | 4/2008 | Turukhin et al. | 398/34 |

(Continued)

OTHER PUBLICATIONS

Otto, Hans-Jürgen, "Mitigation of mode instabilities by dynamic excitation of fiber modes" Fiber Lasers X: Technology, Systems, and Applications, vol. 8601, 86010A, 2013, 7 pgs.

(Continued)

*Primary Examiner* — Yuanda Zhang
*Assistant Examiner* — Michael Carter
(74) *Attorney, Agent, or Firm* — John A. Miller; Miller IP Group, PLC

(57) ABSTRACT

A seed beam source for a fiber amplifier system. The seed beam source includes a plurality of continuous wave master oscillator lasers, each generating a laser beam at a different wavelength and a plurality of switching modulators each receiving the laser beam from a particular one of the master oscillator lasers, where each switching modulator is electrically driven so as to output the laser beam as pulses based on a predetermined timing control. The seed beam source further includes an optical coupler responsive to the optical pulses from the plurality of switching modulators where the optical coupler only receives one of the optical pulses from the plurality of switching modulators at any particular point in time, and where the optical coupler continuously receives the optical pulses from the plurality of switching modulators and outputs an interleaved continuous optical seed beam including the pulses from all of the switching modulators.

18 Claims, 2 Drawing Sheets

(56) References Cited

U.S. PATENT DOCUMENTS

| | | | |
|---|---|---|---|
| 2009/0180498 A1 | 7/2009 | Schmidt | |
| 2010/0158522 A1 | 6/2010 | Cho | |
| 2010/0238958 A1 | 9/2010 | Creeden | |
| 2011/0002029 A1* | 1/2011 | McDonald | 359/276 |
| 2011/0280581 A1 | 11/2011 | Chann | |
| 2011/0292498 A1* | 12/2011 | Chann et al. | 359/341.1 |

OTHER PUBLICATIONS

White, J. O., "Suppression of stimulated Brillouin scattering in optical fibers using a linearly chirped diode laser" Optics Express, vol. 20, No. 14, Jul. 2, 2012, 10 pgs.

Jauregui, Cesar, "Physical origin of mode instabilities in high-power fiber laser systems" Optics Express, vol. 20, No. 12, Jun. 4, 2012, 14 pgs.

Kai, Han, "Multi-wavelength laser active coherent combination" Chin. Phys. B, vol. 21, No. 5, 2012, China, 8 pgs.

Wang, Xiao-Lin, "Coherent Beam Combining of Two Fiber Amplifiers Seeded by Multi-Wavelength Fiber Laser" Chin. Phys. Lett., vol. 27, No. 12, 2010, China, 4 pgs.

Kuo, Bill P. P., "Widely-Tunable, Multi-Wavelength Short Wave Infrared Light Source based on Fiber Optical Parametric Oscillator" IEEE OSA/OFC/NFOEC 2010, USA, 3 pgs.

* cited by examiner

MULTI-WAVELENGTH SEED SOURCE FOR COHERENT FIBER AMPLIFIERS

BACKGROUND

1. Field

This invention relates generally to a seed beam source for generating an optical seed beam for a fiber laser amplifier and, more particularly, to a seed beam source for generating an optical seed beam for a fiber laser amplifier, where the seed beam source interleaves a plurality of seed beams having different wavelengths into a single seed beam.

2. Discussion

High power laser amplifiers have many applications, including industrial, commercial, military, etc. Designers of laser amplifiers are continuously investigating ways to increase the power of the laser amplifier for these applications. One known type of laser amplifier is a fiber laser amplifier that employs seed beams, doped fibers and pump beams to generate the laser beam in a manner well understood by those skilled in the art. Typically, a high power fiber laser amplifier employs a fiber that has an active core diameter of about 10-20 μm or larger. Modern fiber laser amplifier designs have achieved single fiber power levels up to 10 kW. Some fiber laser systems employ multiple fiber laser amplifiers and combine them in some fashion to provide higher powers.

Fibers used for high power fiber lasers of the diameter mentioned above support multiple transverse propagation modes, but are typically used to generate an output beam only in the lowest order fundamental mode $LP_{01}$, which is near Gaussian. A fundamental issue inhibiting further scaling of $LP_{01}$ mode output power from these fibers beyond about 1.5 kW is the threshold onset of power transfer to higher order modes (HOMs) from the fundamental mode. As is well understood in the art, light propagating in the lowest order fundamental mode typically has higher beam quality, where light that propagates in the high order modes incurs a reduction in spatial beam quality. This effect has inhibited the development of multi-kW, low-nonlinearity, highly coherent fiber amplifiers with a single-transverse mode output required for various applications.

Optical power transfer of laser light to HOMs generally occurs as a result of the formation of a moving long-period grating (LPG) in the fiber core refractive index that is written by the interference pattern between the fundamental mode $LP_{01}$ and the next higher order mode $LP_{11}$. Numerous experimental studies have shown that the mechanism for such a refractive index change in the fiber leading to formation of the LPG is thermal. More particularly, light propagating in the multiple modes will interfere with each other in the fiber creating an optical intensity grating, where the period of the grating caused by the interference is a characteristic of the fiber modes and optical wavelength. The optical interference creates thermal variations through the volume of the fiber depending on the particulars of the interference between the light beams in the different modes, which changes the index of refraction of the fiber core, and which causes the light to scatter. The scattered light is matched in phase, which causes a transfer of power from the fundamental mode to higher order modes. As optical output power increases, the LPG amplitude increases, and optical coupling builds up exponentially, eventually reaching a threshold level above which optical power dynamically fluctuates between modes. The dynamic fluctuation in modal powers is consistently observed to occur on time scales corresponding to the thermal diffusion time across the fiber core, typically about 1 ms for 20 um class core diameters in silica fibers.

The dynamic nature of the power transfer suggests that the propagation mode transfer mechanism could be inhibited by dynamically changing the phase of the LPG relative to that of the light beams on a similar or faster time scale than the thermal diffusion time. This concept has recently been verified experimentally by dynamically changing the relative amplitude and phase in a super-position of launched modes in a closed-loop servo-configuration.

Another approach to solve this problem of light propagating into higher order modes may be to substantially broaden the seed beam linewidth. Because of dispersion of the effective index of refraction difference between modes, the LPG spatial frequency will depend on the seed beam wavelength. With sufficiently broad seed beams, the LPG will wash out on a length scale comparable to the gain length, and thus prevent coherent HOM coupling. Conceptually, this is similar to standard methods used for mitigation of stimulated Brillouin scattering (SBS). However, calculations based on the intermodal dispersion suggest that the linewidths required for significant suppression appear to be much broader than for SBS on the order of one or more nanometers.

With continuous broad nm-class seed beam linewidths, it can be difficult to manage the evolution of the spectral phase and amplitude as the seed beam propagates through the high power amplifier chain. If spectral phase and amplitude are not maintained, either due to dispersion or multi-path interference affects, then an initially pure frequency-modulated (FM) source will partially convert to an amplitude-modulated (AM) source, i.e., the intensity will vary in time. This can, in turn, lead to nonlinear phase modulation from the Kerr nonlinearity that can broaden the output seed beam linewidth or reduce the coherence of the output beam, thus impeding further scaling via beam combining.

DETAILED DESCRIPTION OF THE EMBODIMENTS

Figure 1:
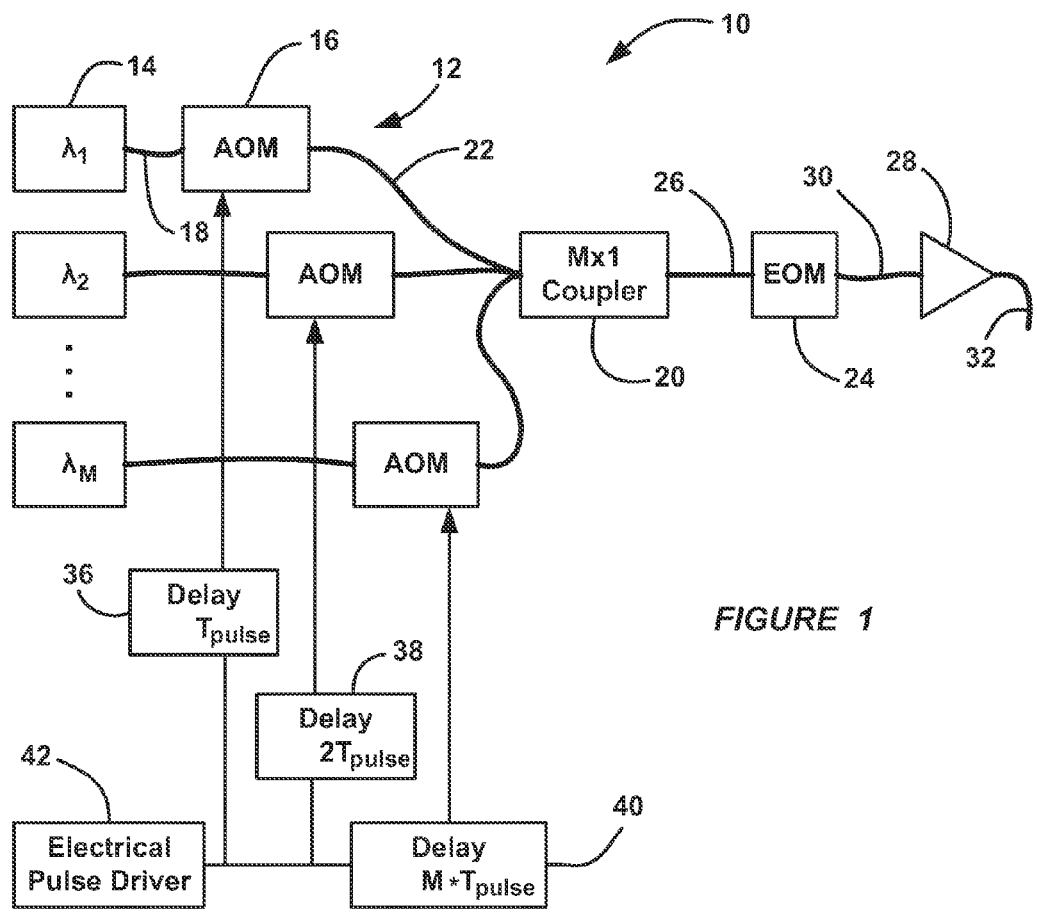
FIG. 1 is a block diagram of a multi-wavelength seed beam source and single fiber amplifier.

The following discussion of the embodiments of the invention directed to a seed beam source for generating a seed beam for a fiber laser amplifier is merely exemplary in nature, and is in no way intended to limit the invention or its applications or uses.

The present invention proposes a seed beam source for generating a seed beam for a fiber laser amplifier that reduces the thermal instability caused by light coupling into high order fiber modes as a result of a moving long-period grating (LPG) as discussed above. The period of the grating created by this effect is dependent on the wavelength of light that is propagating in the fiber core. Therefore, if the wavelength of the light propagating through the fiber core is continually changing at a certain duty cycle, then the LPG created by a previous wavelength seed beam propagating down the fiber will not couple the new wavelength seed beam propagating down the fiber into the higher order modes. It has been shown that it is only necessary to change the wavelength of the seed beam by a few nanometers, and since the laser amplification process employing a pump beam covers a relatively wide bandwidth, the change in the wavelength of the seed beam does not significantly affect the laser amplification process. Based on this discussion, the seed beam source interleaves optical pulses having a certain pulse width and different wavelengths so as to prevent or reduce coupling between light propagating in two or more modes.

Consider the case where the seed beam source interleaves two seed beams having different wavelengths. If the wavelengths are spaced sufficiently far enough apart, then the long-period grating formed by one seed beam will not be phase-matched for mode-coupling of the other seed beam, and vice-versa. If the switching frequency between the two wavelengths is faster than the thermal diffusion time across the fiber core, then the heat loads that drive the respective LPGs will be halved, thus reducing the LPG amplitude by a factor of two, and correspondingly increasing the power threshold for the onset of mode instabilities. This concept is extendable to M different seed beam source wavelengths, where M is an integer that is greater than or equal to 2. Here, each of the M wavelengths are switched in a time less than or equal to the thermal diffusion time across the fiber core, thus reducing the heat load that drives each respective LPG by a factor of 1/M. This increases the mode instability threshold by a factor of M.

In general, the required wavelength spacing will depend on both the details of the fiber design and the amplifier architecture. The fiber parameter that is of primary importance is dispersion in the effective modal index difference between propagation modes $LP_{01}$ and $LP_{11}$. The amplifier architecture determines the effective gain length for HOM coupling. This is a complex relationship relating to the interdependence of many factors including thermal deposition profile, pump arrangements, gain saturation in the fiber core, and differential loss between modes. In practice, such gain lengths may be calculated numerically or be determined empirically by measuring the threshold for mode conversion. Typically, for large mode area fibers suitable for multi-kW scaling, the wavelength spacing between the seed beam lasers will be on the order of ~1 terahertz for a gain length on the order of meters.

The dual wavelength concept discussed above can be extended to M>2 wavelengths for further scaling by a factor M. Presuming a single amplifier can handle about 30 nm of total bandwidth, which is well within the gain bandwidth for Yb-doped fibers, such an approach could potentially provide up to a factor of M~10× increase in the HOM threshold, at which point other effects, such as Raman scattering or damage, would likely limit power. Alternatively, this level of suppression could enable use of other fiber designs with larger core diameters and lower nonlinearity that are currently unusable due to the HOM instability.

FIG. 1 is a block diagram of a multi-wavelength seed beam source 10 suitable for the seed beam source described above. The source 10 includes a plurality of M beam channels 12 each having a continuous wave master oscillator (MO) laser 14 operating at different wavelengths $\lambda_1, \lambda_2, \ldots, \lambda_M$, where the wavelength spacing between the MO lasers 14 is selected to suppress HOM coupling as discussed herein. Each MO laser 14 provides a beam to a synchronously triggered amplitude modulator 16, which can be an acousto-optic amplitude modulator (AOM), on a fiber 18. As will be discussed below, the AOM 16 in each of the channels 12 are individually time-gated so that only one of the AOMs 16 is providing an optical pulse from the particular MO laser 14 in that channel so that only one of the AOMs 16 is outputting an optical pulse at any given point in time. All of the time-controlled beam pulses are provided to an optical coupler 20 on a fiber 22, where the coupler 20 only receives one of the beam pulses from all of the channels 12 at a particular point in time.

The coupler 20 outputs the particular beam being received to an electro-optical modulator (EOM) 24 on a fiber 26 that frequency modulates the beam to suppress stimulated Brillouin scattering (SBS). Particularly, the EOM 24 may be used to provide additional linewidth broadening of the seed beam downstream of the coupler 20 for the purpose of SBS suppression. The EOM-based broadening may be, for example, from a white noise source, or a digital pseudo-random bit sequence (PRBS) design to disrupt SBS. This added linewidth broadening will typically be on the order of about 10 GHz full width, which is much narrower than the typically THz class spacing between wavelengths. This broadening ensures that the linewidth is on the order of about 10 GHz during any given time window corresponding to a round-trip time in the amplifier fiber, typically about 100 ns for a 10 meter long amplifier, hence ensuring a short coherence length to disrupt the formation of SBS. The total output time-averaged spectrum will be the convolution of the switched multi-wavelength source with the EOM broadening. Because the instantaneous frequency in the fiber is narrow line, i.e., on the order of about 10 GHz for any given 100 ns time window, it is relatively easy to maintain the spectral amplitude and phase over these narrow ranges to avoid an FM to AM conversion arising, for example, from dispersion or multi-path interference effects, and subsequent loss of beam coherence. For example, to maintain coherence there is no need to precisely path match group delays across the entire terahertz spectral range, but only over the instantaneous 10 GHz spectral range defined by the EOM 24.

Figure 2:
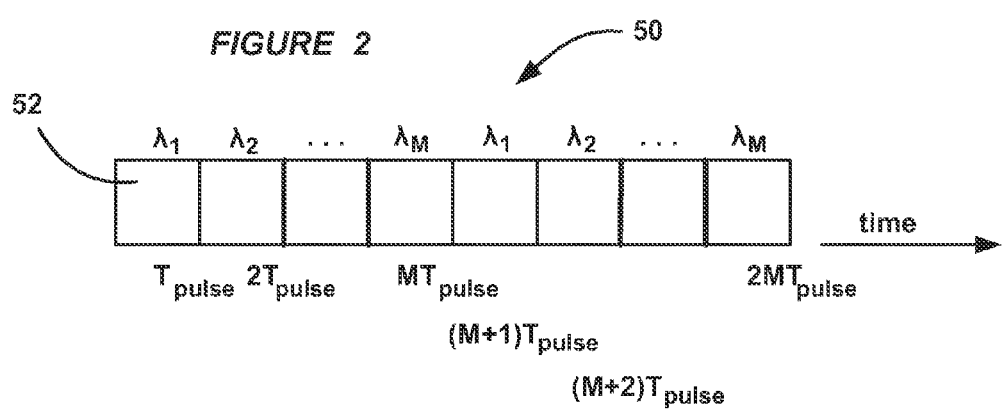
FIG. 2 is a timing illustration for interleaving the multi-wavelength seed beams into a single seed beam.

The beams from the MO lasers 14 are individually time-gated by synchronously triggering the AOMs 16. Particularly, the AOMs 16 are gated by an electric pulse driver 42 through delay devices 36, 38 and 40 for the wavelengths $\lambda_1, \lambda_2, \ldots, \lambda_M$, respectively, where the electrical triggering signal $T_{pulse}$ from the pulse driver 42 is selectively provided to the particular AOM 16 based on the delay provided by the delay devices 36, 38 and 40. FIG. 2 is an illustration of a timing diagram 50 showing how the delay devices 36, 38 and 40 selectively control the AOMs 16 so that a continuous beam is provided to the coupler 20, but from only one of the AOMs 16 at a given point in time. The timing diagram 50 includes consecutive time slots 52 where each time slot 52 represents the time (pulse width) that one of the channels 12 is providing its beam to the coupler 20, as shown by wavelengths $\lambda_1, \lambda_2, \ldots, \lambda_M$. FIG. 2 also represents the time series of wavelengths of the light propagating downstream of the coupler 20 in the fibers 26, 30 and 32. In FIG. 2, $M \times T_{pulse} \leq 1$ is the thermal diffusion time across the fiber core.

Since the LPG is formed in the fiber by thermal effects, it must be disrupted via the wavelength switching on a time scale that is faster than the thermal diffusion time across the fiber core. Typical AOM switching speeds are less than 10 ns during which multiple wavelengths will be present in the fiber and coherence may be lost due to linear dispersion or non-linear four-wave mixing. To be faster than the ~1 ms thermal diffusion time, the required switching frequency to switch between all M wavelengths is likely to be greater than 1 kHz. Hence, the duty cycle reduction from this source is only about 10 ns×1 kHz×M=0.001%×M, resulting in negligible power loss in a beam-combined laser system. Use of AOM-based switching also provides a high intrapulse contrast of about ~60 dB, which is necessary to prevent FWM between the two wavelengths during the pulse itself.

Switching wavelengths may also transiently disrupt phase locking in a coherently combined master oscillator power amplifier architecture. This can be viewed as a duty cycle impact on system efficiency, where the relevant duty cycle time scale is defined by the convergence time of a phase-locking servo-control system. For typical servo-control system speeds of about 300 krad/s, the convergence time from an un-phased state would be approximately $\pi/(300 \text{ krad/s})=10$ µs, hence the duty cycle impact would be about (10 µs)×(1 kHz)×M=1%×M. Such a duty cycle impact could potentially represent a substantial loss of efficiency. However, numerous approaches to compensate for this appear straight forward, including active path (group delay) matching, tailoring of the relative amplitudes of the seed beams so as to match their phase via the Kerr phase shift, or implementing feed-forward stabilization based on detection of the wavelength-dependent phase shift, which should change much more slowly than the overall piston phase.

In FIG. 1, the output beam of the seed source 10 is provided to a single fiber amplifier 28 on fiber 30 that provides an amplified fiber beam on fiber 32. The fiber amplifier 28 would receive one or more pump beams (not shown) as would be well understood by those skilled in the art to provide the light amplification. Further, the fiber amplifier 28 is intended to represent a single fiber amplifier or a plurality of cascaded fiber amplifiers. The multi-wavelength seed beam concept described above can be extended to a multiple fiber amplifier array operating in parallel to increase beam power.

Figure 3:
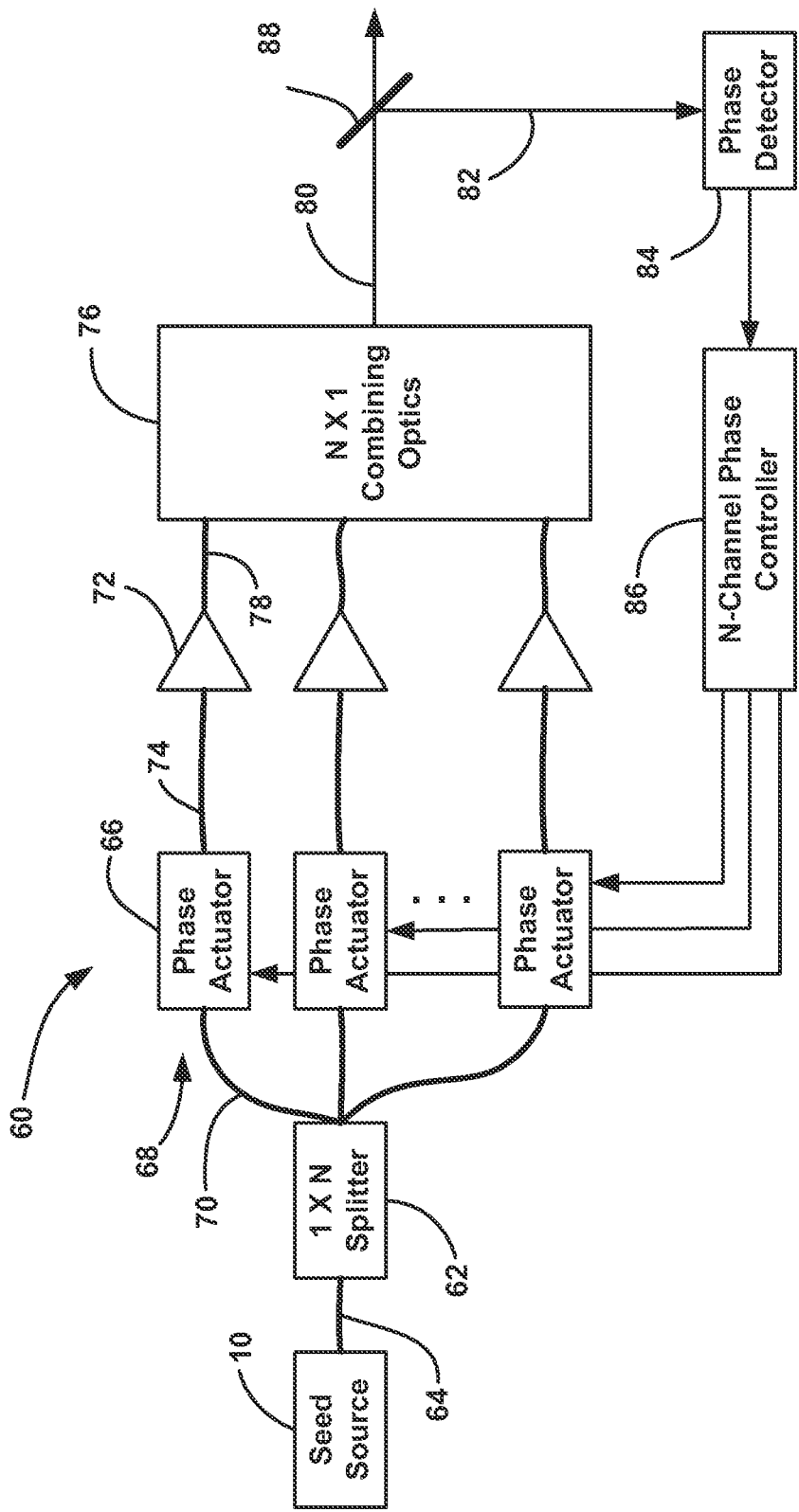
FIG. 3 is a block diagram of an optical system employing the multi-wavelength seed beam source in a coherently combined array of N fiber amplifiers.

FIG. 3 is a block diagram of a fiber amplifier system 60, where the seed beam source 10 provides the multi-wavelength interleaved seed beam on an optical fiber 64, representing the optical fiber 30. Instead of providing the seed beam to the single fiber amplifier 28 as discussed above, the seed beam is split by a 1×N splitter 62 into multiple beam channels 68, where the seed beam is provided to a phase actuator 66 in each channel 68 on a fiber 70. The phase actuator 66 corrects the phase of all of the wavelengths in each channel so that the seed beam in each channel 68 is in phase with the other seed beams at a particular point in time to be combined into single coherent output beam. Each of the phase actuators 66 also imposes a unique dither modulation onto the seed beam that is used to identify the particular seed beam after it is combined with the other seed beams. The seed beam from the phase actuator 66 is provided to a fiber amplifier 72 on a fiber 74 to be amplified by a pump beam as discussed above, where the amplified seed beams are provided to N×1 combining optics 76 to combine all of the amplified seed beams into a single combined output beam 80.

In order to detect the phase of each of the seed beams in the combined beam 80 to provide the phase correction in the phase actuators 66, a low power sample beam 82 is split from the combined beam 80 by a beam splitter 88 and is directed to a phase detector 84, such as a photodetector, that converts the sample beam to an electrical signal. The electrical signal from the phase detector 84 will include frequency tones depending on the dither frequency that was applied to the particular seed beam by the phase actuator 66 so that the electrical signal includes a super-position of the tones at defined unique dither frequencies provided by the phase actuators 66. The electrical signal from the phase detector 84 is provided to an N-channel phase controller 86 that identifies the relationship between the dither frequencies and controls each of the phase actuators 66 in the channel 68 so that the phase of the fiber beams are locked in phase in a manner well understood by those skilled in the art.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A seed beam source for a fiber amplifier system, said seed beam source producing a seed beam having reduced thermal instability caused by coupling of seed beam light propagating through an optical fiber into higher order modes, said optical fiber having a fiber core, said seed beam source comprising:
   a plurality of M continuous wave master oscillator lasers, each generating a laser beam at a different wavelength;
   a plurality of M switching modulators each receiving the laser beam from a particular one of the master oscillator lasers, each switching modulator being controlled so as to output its laser beam as optical pulses based on a predetermined timing sequence, wherein the plurality of M switching modulators are also controlled so that the optical pulses have a pulse width that is less than or equal to 1/M times a thermal diffusion time across the fiber core so as to provide the reduced thermal instability;
   an optical coupler responsive to the optical pulses from the plurality of switching modulators where the optical coupler only receives one of the optical pulses from the switching modulators at any particular point in time, and where the optical coupler continuously receives the optical pulses from the plurality of switching modulators and outputs an interleaved continuous optical seed beam including the optical pulses from all of the switching modulators; and
   an electrical pulse driver selectively providing an electrical signal to the plurality of switching modulators so as to cause the switching modulators to only output one of the optical pulses at the particular point in time.

2. The seed beam source according to claim 1 wherein the switching modulators are synchronously triggered acousto-optic amplitude modulators.

3. The seed beam source according to claim 1 further comprising a plurality of delay devices one for each master oscillator laser, each of the delay devices receiving the electrical signal from the electrical pulse driver and selectively controlling the switching modulators for the predetermined timing sequence.

4. The seed beam source according to claim 1 wherein the plurality of master oscillator lasers provide the laser beams to have a difference in wavelength of at least one nanometer.

5. The seed beam source according to claim 1 further comprising an electro-optic modulator that receives the interleaved seed beam from the optical coupler and that frequency modulates the seed beam to suppress stimulated Brillouin scattering.

6. The seed beam source according to claim 1 wherein the fiber amplifier system includes a single channel of one or more fiber amplifiers.

7. The seed beam source according to claim 1 wherein the fiber amplifier system includes an array of coherently combined N fiber amplifiers.

8. A seed beam source for a fiber amplifier system, said seed beam source producing a seed beam having reduced thermal instability caused by coupling of seed beam light propagating through an optical fiber into higher order modes, said optical fiber having a fiber core, said seed beam source comprising:
   a plurality of M optical devices each generating a laser beam at a different wavelength;

a plurality of M switching devices each receiving the laser beam from a particular one of the optical devices, each switching device being controlled so as to output its laser beam as optical pulses based on a predetermined timing sequence, wherein the plurality of M switching devices are also controlled so that the optical pulses have a pulse width that is less than or equal to 1/M times a thermal diffusion time across the fiber core so as to provide the reduced thermal instability; and an optical coupler responsive to the optical pulses from the plurality of switching devices where the optical coupler only receives one of the optical pulses from the switching devices at any particular point in time, and where the optical coupler continuously receives the optical pulses from the switching devices and outputs an interleaved continuous optical seed beam including the optical pulses from all of the switching devices.

9. The seed beam source according to claim 8 wherein the optical devices are master oscillator lasers.

10. The seed beam source according to claim 8 wherein the switching devices are synchronously triggered acousto-optic amplitude modulators.

11. The seed beam source according to claim 8 further comprising a plurality of delay devices one for each of the M optical devices, each of the delay devices providing an electrical signal to selectively control the switching devices for the predetermined timing sequence.

12. The seed beam source according to claim 8 wherein the plurality of optical devices provide the laser beams to have a difference in wavelength of at least one nanometer.

13. The seed beam source according to claim 8 further comprising an electro-optic modulator that receives the seed beam from the optical coupler and that frequency modulates the seed beam to suppress stimulated Brillouin scattering.

14. The seed beam source according to claim 8 wherein the fiber amplifier system includes a single channel of one or more fiber amplifiers.

15. The seed beam source according to claim 8 wherein the fiber amplifier system includes an array of coherently combined N fiber amplifiers.

16. A seed beam source for a fiber amplifier system, said seed beam source producing a seed beam having reduced thermal instability caused by coupling of seed beam light propagating through an optical fiber into higher order modes, said optical fiber having a fiber core, said seed beam source comprising:

a plurality of M continuous wave master oscillator lasers, each generating a laser beam at a different wavelength, wherein the plurality of master oscillator lasers provide the laser beams to have a difference in wavelength of at least two nanometers;

a plurality of M synchronously triggered acousto-optic amplitude modulators (AOMs) each receiving the laser beam from a particular one of the master oscillator lasers, each AOM being controlled so as to output its laser beam as optical pulses based on a predetermined timing sequence, wherein the plurality of M synchronously triggered AOMs are also controlled so that the optical pulses have a pulse width that is less than or equal to 1/M times a thermal diffusion time across the fiber core so as to provide the reduced thermal instability;

an optical coupler responsive to the optical pulses from the plurality of AOMs where the optical coupler only receives one of the optical pulses from the AOMs at any particular point in time, and where the optical coupler continuously receives the optical pulses from the plurality of AOMs and outputs an interleaved continuous optical seed beam including the optical pulses from all of the AOMs;

an electrical pulse driver selectively providing an electrical signal to the plurality of AOMs so as to cause the AOMs to only output one of the optical pulses at the particular point in time;

a plurality of delay devices one for each master oscillator laser, each of the delay devices receiving the electrical signal from the electrical pulse driver and selectively controlling the AOMs for the predetermined timing sequence; and an electro-optic modulator that receives the interleaved seed beam from the optical coupler and that frequency modulates the seed beam to suppress stimulated Brillouin scattering.

17. The seed beam source according to claim 16 wherein the fiber amplifier system includes a single channel of one or more fiber amplifiers.

18. The seed beam source according to claim 16 wherein the fiber amplifier system includes an array of coherently combined N fiber amplifiers.

* * * * *